(12) United States Patent
Tan et al.

(10) Patent No.: US 6,424,688 B1
(45) Date of Patent: Jul. 23, 2002

(54) METHOD TO TRANSFER DATA IN A SYSTEM WITH MULTIPLE CLOCK DOMAINS USING CLOCK SKIPPING TECHNIQUES

(75) Inventors: Teik-Chung Tan; Derrick R. Meyer, both of Austin; Brian D. McMinn, Buda, all of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/429,117

(22) Filed: Oct. 27, 1999

(51) Int. Cl.$^7$ .............................. H04L 7/00; G06F 1/04
(52) U.S. Cl. ...................................... 375/354; 713/600
(58) Field of Search .................................. 375/354, 355, 375/375, 376, 372, 359; 713/322, 600, 601, 400; 327/156, 147, 141

(56) References Cited

U.S. PATENT DOCUMENTS

| | | | |
|---|---|---|---|
| 4,419,739 A | 12/1983 | Blum ........................... | 713/600 |
| 4,866,310 A | 9/1989 | Ando et al. ..................... | 326/93 |
| 5,045,725 A | 9/1991 | Sasaki et al. ................... | 326/37 |
| 5,224,129 A | 6/1993 | Lueker et al. .................. | 375/371 |
| 5,448,715 A | 9/1995 | Lelm et al. .................... | 713/600 |
| 5,768,529 A | 6/1998 | Nikel et al. ................... | 709/232 |
| 5,999,023 A | 12/1999 | Kim ............................. | 327/144 |
| 6,154,497 A | * 11/2000 | Gatherer et al. ............... | 327/146 |
| 6,161,187 A | * 12/2000 | Mason et al. .................. | 326/98 |

OTHER PUBLICATIONS

AMD Athlon™ Processor Technical Brief, Dec. 1999, © Advanced Micro Devices, Inc., pp. 1–7.

AMD Athlon™ Processor Module Data Sheet, Jun. 2000, © Advanced Micro Devices, Inc., pp. 1–64.

LXT9785 Data Sheet, Sep. 2000, © Level One Communications, Inc., pp. 1–105.

* cited by examiner

Primary Examiner—Chi Pham
Assistant Examiner—Khai Tran
(74) Attorney, Agent, or Firm—Conley, Rose & Tayon, PC; B. Noël Kivlin

(57) ABSTRACT

A system and method for transferring data from a first clock domain to a second clock domain wherein a clock skipping technique is employed to maintain the same level of data throughput in the transmitting and receiving domains. In one embodiment, a plurality of serial data values are received from a device in the first clock domain and are stored in a plurality of flip-flops. The data values are clocked into the flip-flops, one value per flip-flop, at a first clock rate corresponding to the first clock domain. After a value is stored in the last flip-flop, the cycle is repeated and the previously stored values are overwritten. The data values are retrieved from the flip-flops after the values have had time to stabilize, but before they are overwritten. The values are retrieved at a second clock rate corresponding to a second clock domain and are transferred to a device in the second clock domain. If the clock rate in the first clock domain is greater than the clock rate of the second clock domain, one or more of the first clock pulses is periodically skipped, according to a predetermined pattern based on the ratio of the clock rates. Thus, the number of data values stored over a period of time is equal to the value retrieved over that period. If the clock rate in the first clock domain is less than the clock rate in the second clock domain, pulses of the second clock signal are periodically skipped to equalize the number of values stored and the number retrieved.

23 Claims, 5 Drawing Sheets

METHOD TO TRANSFER DATA IN A SYSTEM WITH MULTIPLE CLOCK DOMAINS USING CLOCK SKIPPING TECHNIQUES

BACKGROUND OF THE INVENTION

1. Field of the Invention

This invention is related generally to the field of microprocessors and more particularly to the use of clock skipping techniques to transfer data between different clock domains in a microprocessor.

2. Description of Related Art

In simple computer systems, a single clock signal may be used to run all of the devices which are integrated into the microprocessor chip. As shown in FIG. 1, a system PLL (phase locked loop) 11 may provide a clock signal to a microprocessor 12, a memory 13 and a peripheral device 14 via clock line 16. The signal is used to clock data transfers between the devices on bus 15.

While implementation of the system illustrated in FIG. 1 is simple and relatively straightforward, its simplicity results in some performance limitations. One of these limitations relates to the variations in the clock signal which is seen by the various devices on the chip. The use of a network of conductive traces to deliver the clock signal to each of the devices causes reflections, noise and other uncertainties in the signal. These factors cause differences in the signals delivered to different devices, which may in turn limit the devices' ability to communicate data. For example, if there is a skew between the clock signals arriving at two devices, a value may have to be asserted by the transmitting device for a longer time than would otherwise be necessary in order to ensure that the value can be sampled by the receiving device.

In the simple system illustrated in FIG. 1, a data transfer involves two devices in the same clock domain. ("Clock domain" refers to a portion of a system in which the operation of associated devices is based on a particular clock signal.) Thus, the operations of the respective devices are based upon clock signals having the same rate. In the absence of any clock skew, data being transferred from one of these devices to the other must be asserted for a period of time before the data is sampled (the setup time) and a period of time after the data is sampled (the hold time.) If there is any skew between the clock signals at each of the devices, the assertion of the data must be maintained for an additional amount of time which is long enough to account for this difference. While this additional time may not be significant in relation to slower clock speeds, high-performance, high-speed microprocessors have shorter clock periods, so it may not be possible to perform data transfers quickly enough to keep up with the speed of the processor.

Clock forwarding is one technique which can be used to minimize the impact of clock skew and allow improved performance in data transfers. In a clock forwarding scheme, the data bus and system clock described above are replaced by point-to-point data and clock signals. When data is to be transferred from one device to another, the data is transferred along with a corresponding clock signal. Referring to FIG. 2, data is transferred on one or more data lines 18 while a clock signal is forwarded on clock line 19. The data is clocked into a series of storage locations (i.e. flip-flops) according to the forwarded clock signal. The data is then clocked out of the storage locations according to a local clock signal of the receiving device. Both of the clock signals must have the same rate, but a substantial skew in the signals will not prevent reliable transfer of the data.

While clock forwarding provides a means to transfer data between devices operating at the same clock rate, it is often desirable in modern computer systems to use different clock frequencies for different devices. For example, it may be useful to operate the core logic (i.e., the microprocessor logic) and the system logic at different frequencies. The difference in frequencies allows for advances in the performance of one type of logic without requiring equal advances in the other type of logic. Thus, for example, the processor speed can be increased without having to also speed up the system logic.

In these systems, system logic is closely tied to the system bus. As a result, the system logic usually operates at a frequency which is an integer (or half-integer) multiple of the system bus frequency. Because the system logic operates at a frequency which is a multiple of the system bus frequency, clock signals for the system logic can be generated from the same clock as the clock signals for the system bus. If the core logic also runs at a frequency which is an integer or half-integer multiple of the system bus frequency, it can also be easily generated from the system bus clock signal. For example, if the system bus is running at 66 MHz, the system logic and core logic can be operated at 200 MHz (three times the system bus frequency). Then, if desired, the frequency of the core logic can be scaled up to 266 MHz (four times the system bus frequency), while the system logic remains at 200 MHz.

As the operating frequency of the system bus increases, however, it becomes more and more difficult to scale up the speed of the core logic because this would require a larger increase in the frequency. For example, if the system bus is running at 400 MHz and both the core logic and the system logic are running at 800 MHz, the core logic cannot be easily scaled up to 900 MHz. That is, 900 MHz is not an integer or half-integer multiple of the system bus frequency. It may therefore be useful to operate the different sets of logic using multiple clocks instead of a single one.

The use of multiple clock domains in a computer system may create a number of problems which must be addressed in the system. One problem is that, because the clock signals in different domains are derived from different sources, the signals may not be synchronized. The signals may also experience independent, dynamic variations for which the computer system must compensate. If the computer system cannot synchronize the clock signals in the different domains, the logic in one domain will not be able to communicate with the logic in another domain. Another problem is that it is difficult to communicate between two clock domains in which the clock rates are not integer or half-integer multiples of each other.

SUMMARY OF THE INVENTION

One or more of the problems described above may be solved by the various embodiments of the invention. Broadly speaking, the present system and method are used for transferring data from a first clock domain to a second clock domain, wherein the clock rate of one of the domains is not constrained to be an integer or half-integer multiple of the clock rate of the other domain.

One embodiment comprises a method in which a plurality of serial data values (e.g., bits) are received from a device in a first clock domain and are stored in a plurality of storage locations. The data values are clocked into the storage locations at a first clock rate corresponding to the first clock domain. The data values are then retrieved from the storage locations at a second clock rate corresponding to a second clock domain and are transferred to a device in the second clock domain. If the clock rate in the first clock domain is greater than the clock rate of the second clock domain, one or more of the clock pulses in the first clock domain is periodically skipped, according to a predetermined pattern. Thus, the number of data values stored in the storage locations is less than the number of clock pulses in the first clock domain during the period in which the data values are stored. When the data values are retrieved, one data value is retrieved from a storage location for each clock pulse in the second clock domain. If, on the other hand, the clock rate in the first clock domain is less than the clock rate in the second clock domain, one data value is stored for each clock pulse in the first clock domain, while retrieval of the data values periodically skips one of the pulses in the second clock domain.

One embodiment comprises an apparatus having a plurality of flip-flops, wherein the data inputs of the flip-flops are coupled to a serial data line from a device in a first clock domain. The clock inputs of the flip-flops are coupled to a clock signal from the first clock domain. The enable inputs of the flip-flops are coupled to a load counter which cyclically enables each of the flip-flops to load successive data values from the serial data line into successive ones of the flip-flops. The load counter is clocked by the clock signal from the first clock domain. The outputs of the flip-flops are coupled to a multiplexer. The select input of the multiplexer is coupled to an unload counter which is clocked by a clock signal from a second clock domain. The unload counter thereby controls the multiplexer and causes it to cyclically select successive ones of the flip-flops. The output of the multiplexer is coupled to a flip-flop which is clocked by a signal from the second clock domain. The output of this flip-flop is then transferred to the device in the second clock domain. If the clock rate in the first clock domain is greater than the clock rate in the second clock domain, a data value is loaded into one of the flip-flops for each clock pulse from the first clock domain, except for periodically skipped pulses. A data value is then retrieved from one on the flip-flops for each clock pulse from the second clock domain. If, on the other hand, the clock rate in the first clock domain is less than the clock rate in the second clock domain, a data value is loaded into one of the flip-flops for each clock pulse from the first clock domain, while a data value is retrieved from one of the flip-flops for each clock pulse from the second clock domain except for periodically skipped pulses.

BRIEF DESCRIPTION OF THE DRAWINGS

Other objects and advantages will become apparent upon reading the following detailed description and upon reference to the accompanying drawings in which.

Figure 1:
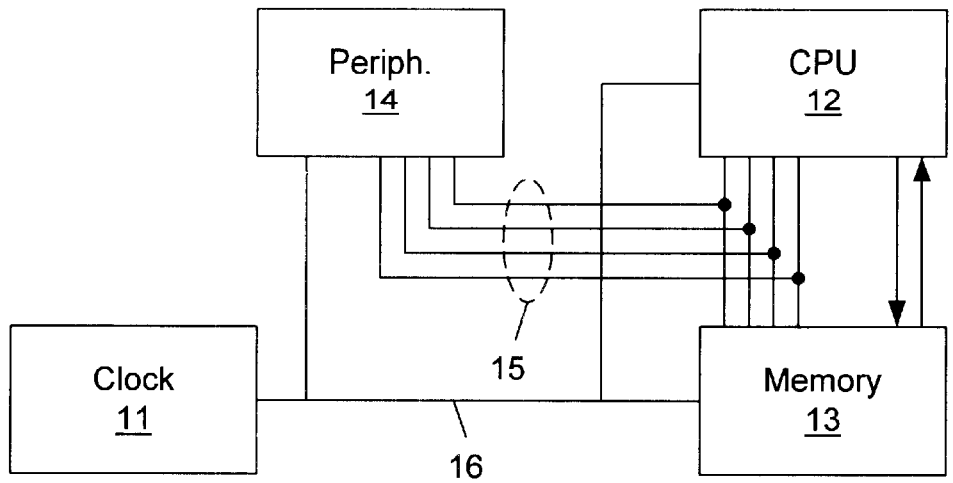
FIG. 1 is an example of a prior art computer system having a single clock domain.
Figure 2:
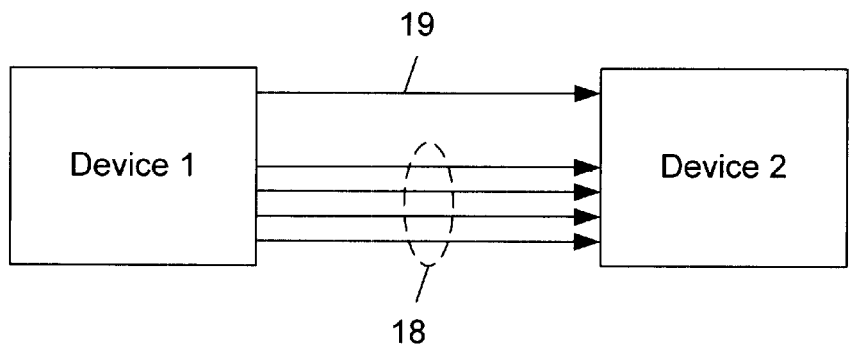
FIG. 2 is an illustration of two devices configured to transfer data using clock forwarding.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

One embodiment of the invention is described below. It should be noted that this embodiment is presented as an example, and many other embodiments of the invention are possible.

One embodiment comprises a system for transferring data from a first clock domain to a second clock domain, wherein the clock rates of the domains are different. Further, the clock rates are not constrained to be integer or half-integer multiples of each other. The data is clocked into a set of storage locations according to a pattern of pulses of a clock signal from the first clock domain, and the data is clocked out of the storage locations according to a pattern of pulses of a clock signal from the second clock domain. One of the patterns includes one or more skipped clock pulses. (For the purposes of this disclosure, "pulse" refers to an edge of a clock signal. The pulses may comprise the rising edges, falling edges, or both, depending upon the implementation of a particular embodiment.)

In one embodiment, the system is implemented in a high-performance computing system. The computing system utilizes a microprocessor chip which includes on-chip peripheral logic. Because it is desired in this embodiment to allow the peripheral logic to operate while the CPU core is "asleep" (i.e., in a power saving mode,) it is necessary to implement separate networks to distribute clock signals to the core logic and to the peripheral logic. Each of these networks defines a separate clock domain which can have a different clock rate.

Figure 3:
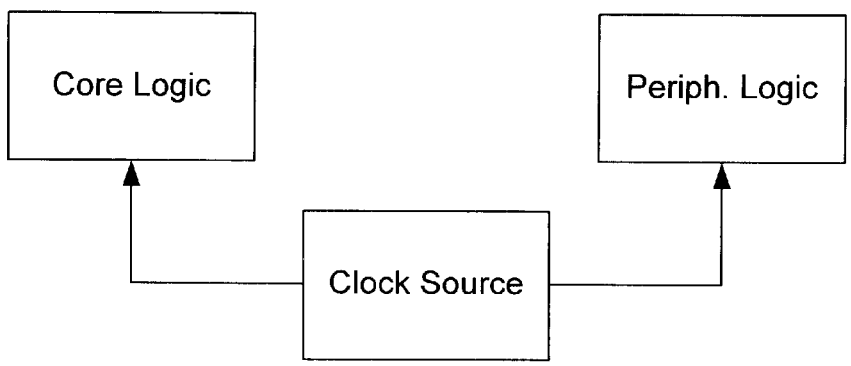
FIG. 3 is a block diagram illustrating the generation of clock signals for two distinct clock domains.

Referring to FIG. 3, the separation of the two clock domains on the microprocessor chip is illustrated. Clock source 21 provides a processor clock signal to core logic 22, thereby establishing a first clock domain. Clock source 21 provides a separate peripheral clock signal to peripheral logic 23, establishing a second clock domain. Although in this embodiment the processor clock signal and peripheral clock signal have different clock rates, the system will also function if both clock rates are the same.

Figure 4:
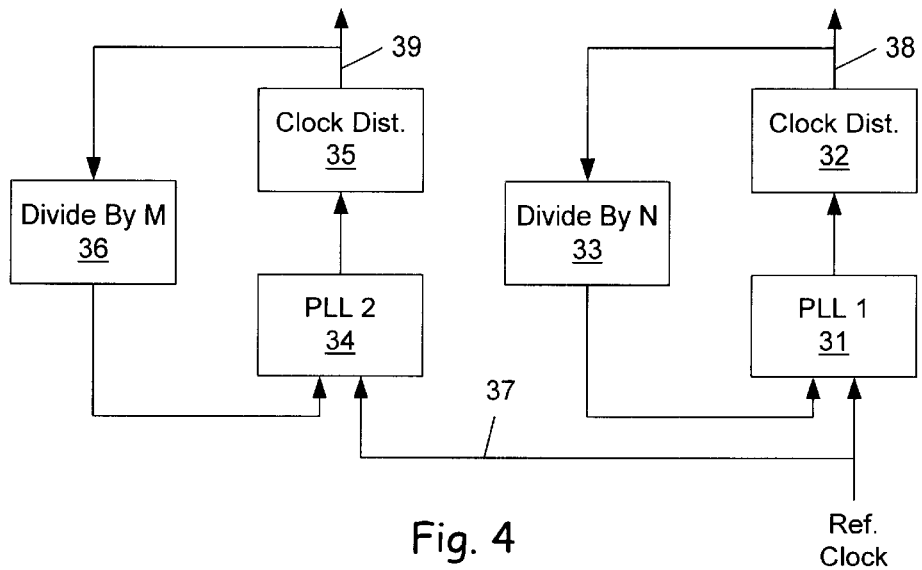
FIG. 4 is a block diagram of a dual-PLL circuit in one embodiment for generating a pair of clock signals for two clock domains.

Referring to FIG. 4, the signals to the two clock domains are provided by a dual-PLL system 30. The system includes two PLLs 31, 34 which are coupled by line 37 to a reference clock (not shown.) Each PLL generates its own clock signal based on the reference clock signal. This generated clock signal is input to distribution circuitry 32, 35. Each of the distribution circuits 32, 35 provides the resulting clock signal to its respective clock domain and to its respective divider circuit 33, 36. Divider circuits 33, 36 provide a clock signal at the original reference clock rate as an input to the respective PLL 31, 34. These inputs to the PLLs enable the PLLs to adjust the phase of their respective signals to minimize their skew from the reference signal. As a result, the skew between the clock signal of the first clock domain and the clock signal of the second clock domain is also minimized.

It is important to minimize the skews between the clock signals for several reasons. As will be explained in detail below, the clock skipping mechanism uses buffers to absorb the skew between the first clock domain and the second clock domain. If there is more skew, more buffers may be required to implement the mechanism. It should also be noted that reducing the skew between the clock signals of the two domains reduces the window of error with which the mechanism has to cope. Because reducing the skew between the clock signals reduces the number of buffers necessary in the mechanism, it has the effect of reducing the latency of data transfers that employ the mechanism and consequently improves performance.

In the dual-PLL system of FIG. 4, divider circuits 33 and 36 define the clock rates of their respective clock domains. Divider circuit 33 provides a signal at 1/N of the clock rate on line 38 and allows PLL 31 to maintain the clock rate on line 38 at N times the reference clock rate. Similarly, divider circuit 36 provides a signal at 1/M of the clock rate on line 39 and allows PLL 34 to maintain the clock rate on line 39 at M times the reference clock rate. Divider circuits 33 and 36 are programmable so that M and N can be set to appropriate values.

Dual-PLL system 30 is implemented in a manner which minimizes differences between the operation of PLLs 31 and 34. The PLLs are set up identically (except for the inputs provided by divider circuits 33 and 36) and share both a power supply and a decoupling network. The PLLs are also intended to share most of the associated test/debug logic. Dual-PLL system 30 is set up this way because it is desirable for the two PLLs to behave as identically as possible in response to dynamic changes in the power supply, temperature and other factors which may affect the clock signals generated by the PLLs. If the PLLs behave identically, errors in the clock signals should be correlated and the effective error should be less than the sum of the respective phase errors. If, on the other hand, the phase errors of the two PLLs are not correlated, effective errors in the dual-PLL system can be minimized by using the output of divider circuit 33 as an input to PLL 34 in place of the reference clock signal. In this configuration, the skew between the clock signals in the two clock domains would be limited to ±1 phase error, instead of ±2.

Data is transferred between the two clock domains using a technique which is similar to clock forwarding. In other words, a first clock signal from a first clock domain is forwarded along with the data that is being transferred from the first clock domain to a second clock domain. The data is temporarily stored in a series of storage locations. The data are delivered to the storage locations serially, and each datum is stored in one of the storage locations when a corresponding clock pulse of the first clock signal is received. The data are retrieved from the storage locations in the order they were stored. Each datum is retrieved from one of the storage locations when a corresponding clock pulse of a second clock signal from the second clock domain is received. Because the first and second clock signals in this embodiment have different clock rates, one or more clock pulses of the faster of the signals must be skipped in order to prevent the associated process (either loading the storage locations or unloading them) from overrunning the other process.

Although any suitable type of storage device may be employed to store the data, the particular embodiments described below utilize flip-flops. For the purpose of this disclosure, references to flip-flops are intended to be construed to include any device that may be used to provide storage locations for the data.

Figure 5:
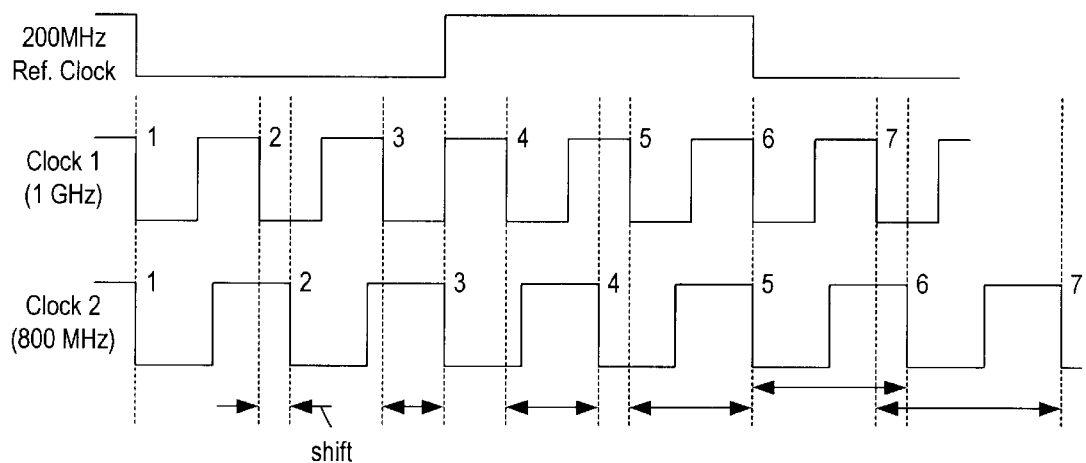
FIG. 5 is an illustration of clock signals for two clock domains and a reference clock signal.

The clock signals of the two clock domains are illustrated in FIG. 5. This figure shows a reference clock signal as well as the clock signals for each of the two clock domains. In this example, the reference signal has a rate of 200 MHz. The clock signals for the two clock domains have rates of 800 MHz and 1.0 GHz. For the purposes of discussing this figure, the 1 GHz signal will be referred to as the first signal, and the 800 MHz signal will be referred to as the second signal. It should be noted that data may be transferred either from the first domain to the second, or vice versa. Thus, the transmitting domain may have either the faster clock signal or the slower clock signal. Both instances may easily be accommodated.

As indicated in FIG. 5, there is no shift between the signals of the two clock domains at the beginning of the reference clock period. That is, they both have a falling edge at the same time as the reference clock. Because the first clock signal has a higher rate than the second, the second falling edge of the first signal occurs before the second falling edge of the second signal. Thus, a shift develops between the two signals. This shift continually increases, so that the shift between the fifth falling edge of each clock signal is equal to the period of the first clock signal. The shifts between subsequent falling edges (e.g., sixth and seventh) even begin to overlap each other.

If a datum is transmitted from a first clock domain on each pulse of the first clock signal and a datum is received in the second clock domain on each pulse of the second clock signal, the amount of transmitted data will quickly outgrow the amount of received data. If the data is being transmitted from the first clock domain into a finite number of storage locations, the stored data will eventually overrun data that has not yet been retrieved from the storage locations and some of the data will be lost. Conversely, if data is being transmitted from the second clock domain (which has the slower clock rate) to the first clock domain (which has the faster clock rate,) the system will eventually attempt to retrieve data from storage locations in which new data has not yet been stored. In either case, the operation of the system will quickly break down.

Figure 6:
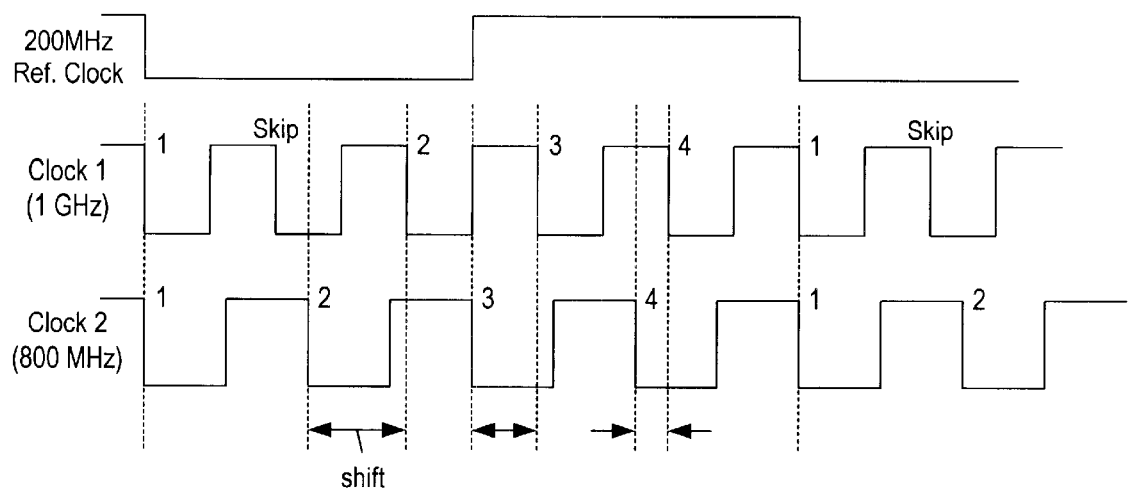
FIG. 6 is an illustration of a pattern of valid and skipped pulses in one embodiment.

FIG. 6 illustrates the clock skipping feature in one embodiment. In this embodiment, the falling edges of the respective clock signals are regarded as the pulses. On pulses which are skipped, no storing (or retrieving) is performed in the corresponding clock domain. On pulses which are not skipped (also referred to herein as "valid" pulses,) a data value is stored (or retrieved) from the storage location. The same clock signals as in FIG. 5 (i.e., signals having the same clock rates) are illustrated in this figure. Every fifth pulse of the first clock signal is skipped, however (as indicated by the pulse numbers and the notation "skip" above the respective skipped pulses.) FIG. 6 illustrates that, for the first (1 GHz) clock domain, the second pulse of every reference clock period is skipped. If the first falling edge of each clock signal is synchronized with the falling edge of the reference clock signal, skipping the second pulse in each reference clock period ensures that the pulses of the first clock signal will always be in synchronization with, or shifted to the right of (i.e., lagging behind) the corresponding pulses of the second clock signal. In other embodiments, the first clock signal may be shifted to the left or the shift may be to both sides of the second signal. It is important to note that constraining the shift of one signal to always fall on one side of the other signal allows a single buffer to be used to absorb the shift. If the shift is allowed to be on the right at some times and on the left at other times, two buffers will be needed to absorb the shift because neither of the buffers will absorb a full clock period of the shift.

By periodically skipping pulses (i.e., not storing/retrieving data on the "skipped" pulses) as illustrated in FIG. 6, the system ensures that, in each period of the reference clock, the number of pulses on which data are loaded into the storage locations is equal to the number of pulses on which data are retrieved from the storage locations. This prevents the faster clock domain from overrunning data in the storage locations or reading storage locations in which there is no stable data.

Figure 7:
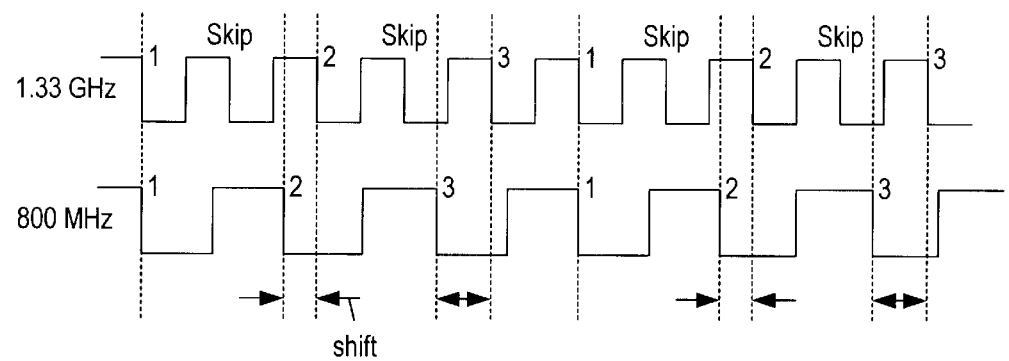
FIG. 7 is an illustration of a pattern of valid and skipped pulses in an alternate embodiment.

In the example above, the skip pattern includes one skipped pulse for every four valid pulses. In other embodiments, the skip pattern need not include one skipped pulse for every n valid pulses. For example, FIG. 7 shows that, for clock domains having frequencies of 800 MHz and 1.33 GHz, the skip pattern has one valid pulse, one skipped pulse, one valid pulse, one skipped pulse, one valid pulse, and then repeats. This pattern sometimes has one valid pulse between skipped pulses, and sometimes has two. Because each of the clock signals is generated from the same reference clock, however, the pattern will repeat every reference clock period.

Figure 8:
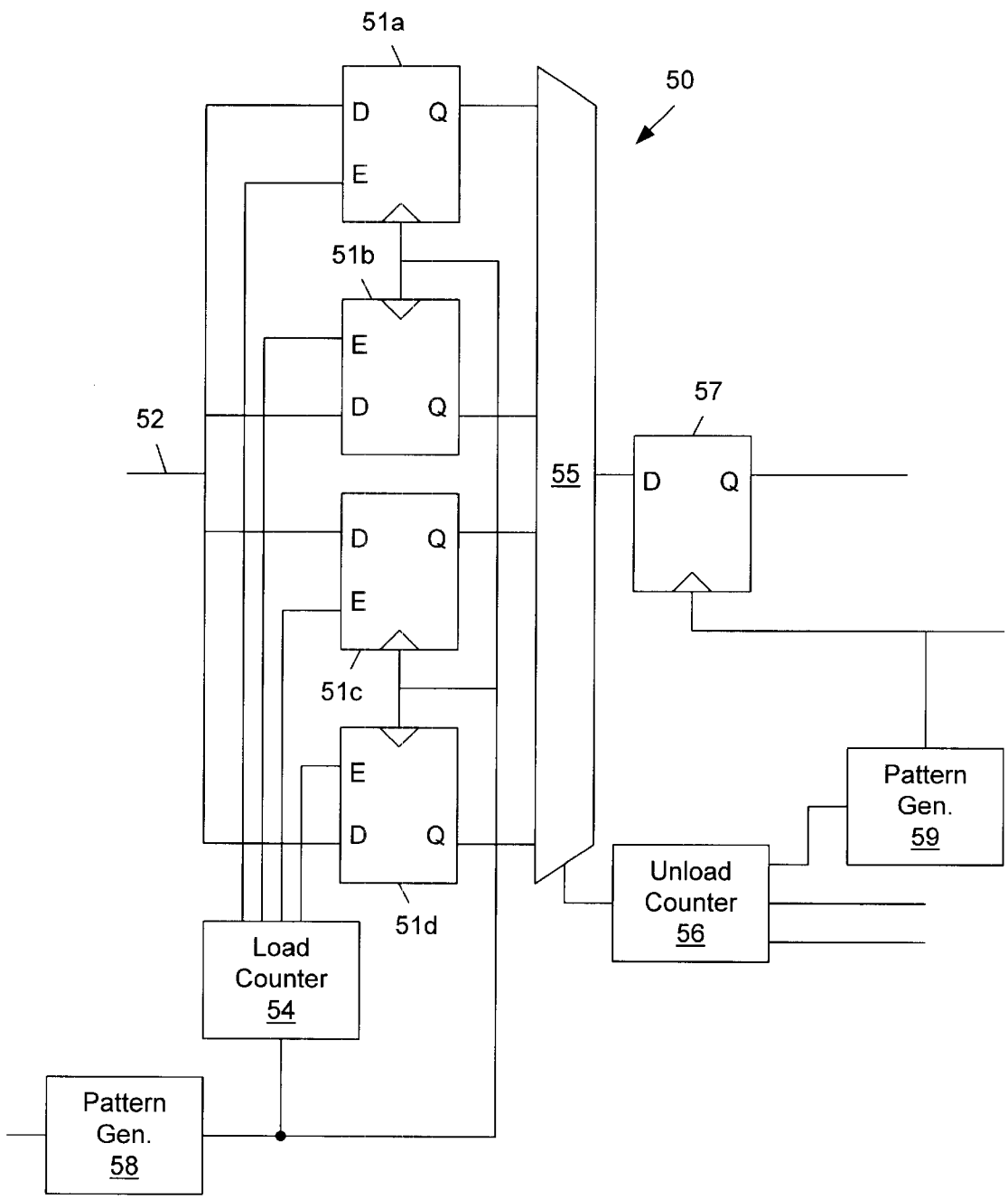
FIG. 8 is a block diagram of a circuit implementing one embodiment.

One embodiment is implemented as shown in FIG. 8. The circuit shown in this figure uses a set of storage locations (flip-flops) to buffer the data and absorb the clock shift which is illustrated in FIGS. 6 and 7. A series of data values are transmitted to system 50 on data input line 52. Data input line 52 is coupled to the data (D) inputs of each of D-type flip-flops 51a–51d. (For purposes of convenience, flip-flops 51a–51d are individually and collectively referred to herein using the single reference number 51.) The clock input of each flip-flop 51 is coupled to clock line 53, which carries the signal produced by pattern generator 58. The enable (E) input of each flip-flop 51 is coupled to one of the outputs of a load counter 54. Load counter 54 is also clocked by the signal on line 53. The output (Q) of each flip-flop 51 is coupled to multiplexer 55. The select input of multiplexer 55 is coupled to an unload counter 56 that controls which of the multiplexer inputs (hence which of the flip-flop outputs) is selected to be output by multiplexer 55. Unload counter 56 is clocked by the signal of pattern generator 59. (It should be noted that, although the embodiment shown in FIG. 8 includes two pattern generators, they are not both strictly necessary, since only the faster clock domain has to skip pulses of its respective clock signal.) The output of multiplexer 55 is coupled to the data input of flip-flop 57, which is clocked by the clock signal of the receiving clock domain. (Load counter 54 and unload counter 56 also have several control inputs which are used to reset the counters and which will be described in more detail below.)

Data is delivered serially to system 50 via line 52. Because the data input to each flip-flop 51 is tied to line 52, each data value is simultaneously applied to each of the flip-flops. The data value which is applied to the inputs of flip-flops 51 is only stored in the one of the flip-flops which is selected by load counter 54. Load counter 54 asserts an enable signal on one of its outputs and deasserts the enable signal on each of its remaining outputs. Each of the counter outputs is coupled to the enable input of a corresponding flip-flop so that only one of the flip-flops is enabled at one time. Consequently, the enabled flip-flop stores the currently applied data value while the other flip-flops (which are disabled) retain the values previously stored in them.

Pattern generator 58 produces a pattern of clock pulses. The pattern may consist of only valid pulses, or it may contain one or more skipped pulses. Each time a valid clock pulse is received by load counter 54 from pattern generator 58, the counter is incremented. Each time load counter 54 is incremented, it asserts an enable signal on a successive one of the outputs coupled to flip-flops 51 (and deasserts the signal on the others.) Thus, each successive data value is stored into a successive one of flip-flops 51. After a data value is stored in the last one of flip-flops 51 (e.g. 51d,) the system cycles back to the first flip-flop (51a) and stores the next data value in it. This cycle is repeated until all of the data is transferred. Although the data value stored in each of the flip-flops will eventually be overwritten, each data value will be retrieved before it is overwritten, as will be explained in more detail below.

Each of the flip-flops 51 asserts at its output the last data value stored in the flip-flop (if any value has yet been stored therein.) These values are provided as inputs to multiplexer 55, which selects one of the inputs to be passed through to flip-flop 57. Multiplexer 55 is controlled by unload counter 56. Unload counter 56 provides a select signal to multiplexer 55 so that each of flip-flops 51 is sequentially selected in the order in which the data values were stored into them. Unload counter 56 is clocked by the signal from pattern generator 59 and is incremented each time a valid pulse is received. Pattern generator 59 produces a pattern of clock pulses which consists of one or more valid pulses, and possibly one or more skipped pulses. The datum output by the selected flip-flop 51 is forwarded to flip-flop 57. Flip-flop 57 is clocked by the signal from the second clock domain and retains the data for one clock period. It then receives the output of a newly selected flip-flop 51 and retains that value for one clock period. Thus, the data values are retrieved from flip-flops 51 in the same order in which they were stored, and a new serial data stream at the clock rate of the second clock domain is generated.

It should be noted that the pattern of pulses corresponding to the faster clock rate will necessarily contain one or more skipped pulses. While the pattern corresponding to the slower clock rate may also include skipped pulses, this would serve only to slow data transfers between the two clock domains, since each skipped pulse in the slower clock domain represents a missed opportunity to transfer a data value.

As indicated above, the data value stored in each flip-flop 51 is retrieved by multiplexer 55 before it is overwritten with a new value. This is accomplished by initializing load counter 54 and unload counter 56 to appropriate values at the beginning of the data transfer. The counter values are chosen to allow the data values to become stable in the flip-flops before they are retrieved. For example, in the system illustrated in FIG. 8, load counter 54 may be initialized to 0 (selecting flip-flop 51a) while unload counter 56 may be initialized to 2 (selecting flip-flop 51c.) When the data transfer begins, the first data value will be stored into flip-flop 51a. The first flip-flop which will be read is 51c, which does not yet have a data value stored therein. Upon the subsequent valid pulse in each of the clock domains, the respective counters will increment so that the second data value will be stored into flip-flop 51b, while the second flip-flop to be read will be 51d. Upon the next valid pulse, the third data value will be stored into flip-flop 5ic and multiplexer 55 will retrieve the first data value from flip-flop 51a. Thus, the data value stored in flip-flop 51a is read two clock periods after it is stored. If this were insufficient, the unload counter could be initialized to 1 to allow the data to stabilize for three clock periods. If only one clock period were necessary to allow the data to stabilize, the unload counter could be set to 3.

It is clear from the example above that a certain minimum number of flip-flops is necessary in order to allow each data value to be written into a flip-flop and allowed to stabilize before being retrieved. The number of required flip-flops can be calculated according to the following equation:

$$\frac{period_{target\ clock} + delay_{max} - delay_{min} + T_{skew} + T_{setup} + T_{hold}}{T_{bit}} + N_{shift}$$

Where:

$period_{target\ clock}$ is the clock period of the receiving clock domain (since each data value, or bit, is transferred on a falling clock edge in the example above, the clock period would be equal to the bit time;)

$delay_{max}$ is the maximum signal delay between the clock domains (if the transmitter and receiver logic are placed next to each other on the clock domain boundary, the delay should be essentially 0;)

$delay_{min}$ is the minimum signal delay between the clock domains;

$T_{skew}$ is the skew between the clock signals of the transmitting and receiving clock domains;

$T_{setup}$ is the setup time for the flip-flops;

$T_{hold}$ is the hold time for the flip-flops; and $N_{shift}$ is the number of flip-flops required to account for the shift between the clock signals (as shown in FIGS. 6 and 7.)

In a particular embodiment, fewer flip-flops or more flip-flops than the four illustrated in FIG. 8 may be necessary. For example, if the skew between the clock signals of the two clock domains increases, the required number of flip-flops may increase to five or more. Conversely, if there is no skew between the clock signals, only two or three may be necessary. It should also be noted that the number of flip-flops calculated according to the foregoing formula represents a minimum number and some embodiments may use more than this minimum number.

It should be noted that other embodiments may use devices other than flip-flops to store the transferred data values. For example, one or more multiple-entry FIFO (first in, first out) memory devices can be used. If the flip-flops in the embodiment described above are replaced with multiple-entry FIFOs, several data values can be loaded in each FIFO before the values are retrieved, thus reducing the required number of storage devices (but increasing the complexity of the devices.) In fact, the flip-flops of the embodiment described above function as a FIFO which can be loaded and unloaded at different rates.

In the embodiment of FIG. 8, flip-flops 51 are loaded (i.e., data values are stored in them) according to the pulses produced by pulse generator 58. Similarly, flip-flops 51 are unloaded (i.e. data values are retrieved via multiplexer 55) according to the pulses produced by pulse generator 59. Each of the pulse generators 58, 59 operates in the same manner, taking the clock signal of the respective clock domain and skipping pulses as appropriate for the ratio of clock rates in the two clock domains. The pulse generators 58, 59 may accomplish this function in a number of ways, such as looking up the appropriate pattern according to the values of M and N (i.e., the clock ratio) or dynamically computing the pattern. It is contemplated that the function of the pulse generators may also be accomplished in other ways, such as providing a clock signal without any skipped pulses and disabling the counter when a pulse should be skipped.

In one embodiment, the pattern generators are initialized to generate a particular skip pattern prior to any data transfer. During initialization, the M and N values corresponding to the transmitting and receiving clock domains are passed to the pattern generators. The patterns are then generated according to the received M and N values before any transfer takes place. During initialization, the system must also set the unload and load counters to the appropriate values so that stable data can be a retrieved from the flip-flops. If the load counter is initialized to 0 (corresponding to the first flip-flop,) the unload counter can be initialized to a value determined by the bit-time and the sum of ($delay_{max}-delay_{min}$), $T_{skew}$, and ($T_{setup}+T_{hold}$). The bit-time can be determined from pin sampling or from the serial bitstream. (It should be noted that, since transfers from a first clock domain to a second clock domain and transfers from the second clock domain to the first are handled separately, the initialization values for each of these transfers may be different.)

As explained above, it is important to set the load and unload counters so that the unloading of the counters lags behind the loading of the counters. This allows the values stored in the flip-flops to stabilize before being read. The system must therefore provide a mechanism for resetting the counters. This may be done either synchronously or asynchronously.

If the counters were reset asynchronously (i.e., reset at slightly different times,) the system would have to gate off the clock signals to the counters while they were being reset. This would ensure that the difference between the counters' values (and the corresponding lag between the loading and unloading of the flip-flops) would not be altered. The clock signals would then be reapplied to the counters. It should be noted, however, that a clock signal having a very high clock rate (e.g., 1 GHz) cannot simply be started at its full clock rate without drawing excessive amounts of current and possibly causing overheating and related problems. This is sometimes referred to as the "dI/dt problem" in reference to the change in current (I) over time. Because of the dI/dt problem, the clock rates of the domains must be ramped up to their normal rates. Consequently, such an asynchronous reset scheme can be very complex and possibly impractical to implement.

Figure 9:
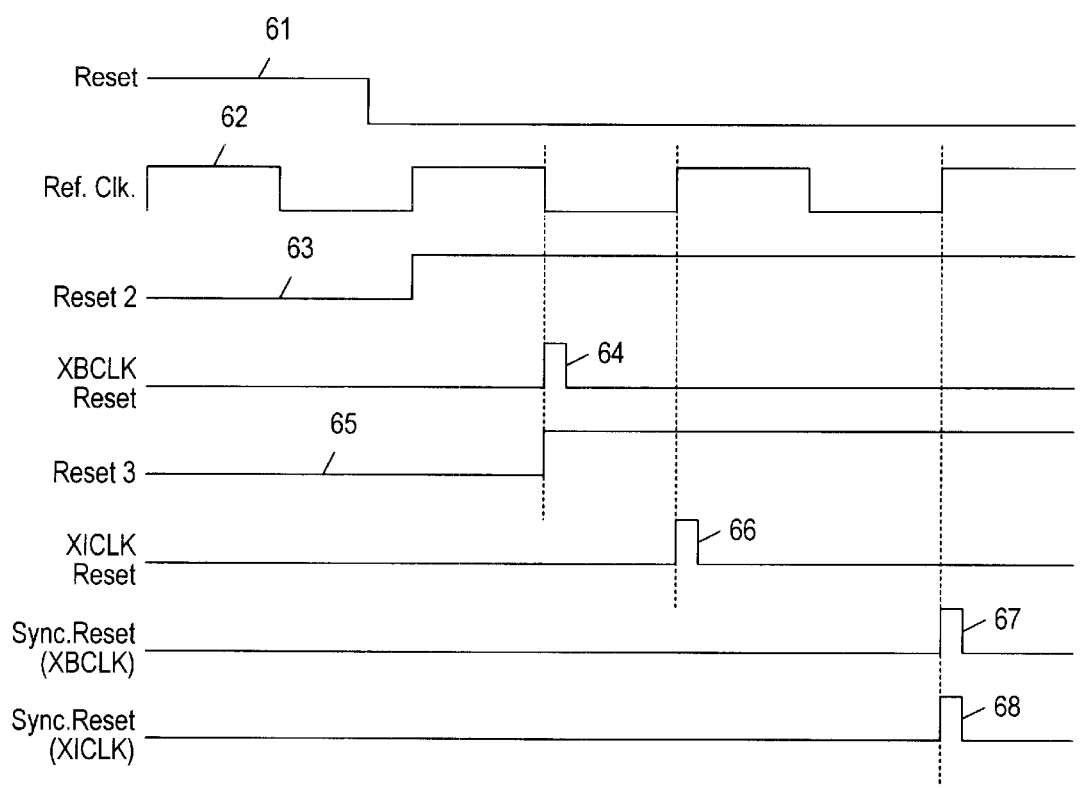
FIG. 9 is an illustration of various signals relating to the synchronous reset of one embodiment.

One embodiment instead uses a synchronous reset scheme. Several timing signals relating to this reset scheme are illustrated in FIG. 9. In this scheme, it is assumed that the skew between the clock signals of the two clock domains is less than half the period of the reference clock 62. After external reset signal 61 is deasserted, reset 2 signal 63 is deasserted on the next rising edge of reference clock 62. Reset 2 signal 63 remains deasserted for at least one reference clock period. On the next falling edge of reference clock 62, reset pulse 64 is generated by sampling reset 2 signal 63. When reset pulse 64 is generated, reset 3 signal 65 is deasserted and remains deasserted for at least one reference clock period. On the next rising edge of reference clock 62, reset pulse 66 is generated by sampling reset 3 signal 65. (As shown in the diagram of FIG. 9, reset 2 signal 63 and reset 3 signal 65 are asserted low.) Because it is known that at least one clock pulse in each clock domain is synchronized per reference clock period, synchronous reset signals 67 and 68 can be generated in the respective clock domains on one of these synchronous clock pulses. (In this embodiment, each clock domain has a pulse synchronized with the falling edge of the reference clock. See FIG. 6.) In the embodiment illustrated in FIG. 9, synchronous reset signals 67 and 68 are generated on the first synchronous pulse following second reset pulse 66.

While the present invention has been described with reference to particular embodiments, it will be understood that the embodiments are illustrative and that the invention scope is not so limited. Many variations, modifications, additions, and improvements to the embodiments described are possible. These variations, modifications, additions, and improvements may fall within the scope of the invention as detailed within the following claims.

What is claimed is:

1. A data transfer device comprising:
    a plurality of storage locations;
    one or more first data lines coupled to said storage locations; and
    one or more second data lines coupled to said storage locations;
    wherein said device is configured to store in said storage locations a series of data values transmitted on said one or more first data lines, each one of said data being stored upon the occurrence of a corresponding valid pulse of a first clock signal, wherein said valid pulses of said first clock signal form a first pattern;
    wherein said device is configured to retrieve from said storage locations said series of data values, each one of said data being retrieved upon the occurrence of a corresponding valid pulse of a second clock signal, wherein said valid pulses of said second clock signal form a second pattern; and
    wherein one of said first and second patterns includes one or more skipped pulses.

2. The data transfer device of claim 1 wherein said device is configured to generate said first and second patterns so that each pulse of one of said first and second patterns lags behind a corresponding pulse of the other of said first and second patterns by between 0 and 1 pulse.

3. The data transfer device of claim 1 wherein said device is configured to repeat each of said first and second patterns for each cycle of a reference clock from which said first clock signal and said second clock signal are generated.

4. The data transfer device of claim 1 wherein neither of said first clock rate and second clock rate is an integer multiple of the other and neither of said first clock rate and second clock rate is a half-integer multiple of the other.

5. The data transfer device of claim 1 wherein said storage locations comprise FIFO buffers.

6. The data transfer device of claim 5 wherein said FIFO buffers comprise D-type flip-flops.

7. The data transfer device of claim 1 further comprising a load counter coupled to said storage locations and configured to cyclically select successive ones of said storage locations for storage of successive ones of said series of data values.

8. The data transfer device of claim 1 further comprising an unload counter coupled to said storage locations and configured to cyclically select successive ones of said storage locations for retrieval of successive ones of said series of data values.

9. The data transfer device of claim 8 further comprising a multiplexer, wherein said multiplexer has a plurality of inputs, wherein each of said plurality of inputs is coupled to a data output of a corresponding one of said storage locations, wherein said unload counter is coupled to said storage locations through said multiplexer by coupling an output of said unload counter to a select input of said multiplexer.

10. The data transfer device of claim 9 further comprising an output storage location coupled to an output of said multiplexer.

11. The data transfer device of claim 1 wherein said plurality of storage locations comprise a number of storage locations determined by: the sum of the period of said second clock signal, a difference in a maximum delay and a minimum delay, a skew time between said first clock signal and said second clock signal, a setup time for said storage locations and a hold time of said storage locations; divided by a bit time; plus one.

12. The data transfer device of claim 1 further comprising a pattern generator coupled to said storage locations and configured to generate one of: said first pattern; and said second pattern.

13. The data transfer device of claim 12 wherein said pattern generator is coupled to a look-up table and is configured to generate said pattern by looking up said one of said first pattern and said second pattern in said look-up table based on a ratio of said first clock signal and said second clock signal.

14. A method comprising:
    storing a plurality of data values in a plurality of storage locations, wherein each said data value is stored upon the occurrence of a corresponding clock pulse from a first clock signal and wherein said clock pulses corresponding to said plurality of stored data values form a first pattern; and
    retrieving said plurality of data values from said plurality of storage locations, wherein each said data value is retrieved upon the occurrence of a corresponding clock pulse from a second clock signal and wherein said clock pulses corresponding to said plurality of retrieved data values form a second pattern;
    wherein if said first clock signal has a higher rate than said second signal, said first pattern includes one or more skipped pulses; and
    wherein if said first clock signal has a lower rate than said second signal, said second pattern includes one or more skipped pulses.

15. The method of claim 14 wherein each pulse of one of said first and second patterns lags behind a corresponding pulse of the other of said first and second patterns by between 0 and 1 pulse.

16. The method of claim 14 wherein said storing comprises receiving said data values serially and successively storing each of said data values into one of said storage locations.

17. The method of claim 16 wherein said storage locations comprise flip-flops and wherein said successively storing comprises applying each of said data values to an input of each of said flip-flops and enabling successive ones of said flip-flops.

18. The method of claim 17 wherein enabling successive ones of said flip-flops comprises:
    coupling an enable input of each of said flip-flops to an output of a counter, wherein said counter enables one of said flip-flops at a time, and
    incrementing said counter each time a successive one of said data values is applied to said inputs of said flip-flops.

19. The method of claim 14 wherein said retrieving comprises successively retrieving said data values from each of said storage locations and forwarding said data values to a device in a second clock domain, wherein said second clock domain comprises devices clocked by said second clock signal.

20. The method of claim 19 wherein said storage locations comprise flip-flops and wherein successively retrieving said data values comprises providing a multiplexer, wherein each of a plurality of inputs of said multiplexer is coupled to an output of one of said flip-flops and wherein said multiplexer is controlled to select successive ones of said flip-flops.

21. The method of claim 14 wherein said storing said plurality of data values in said plurality of storage locations comprises storing said plurality of data values in a plurality of flip-flops.

22. The method of claim 14 wherein if said first clock signal/domain has a higher rate than said second signal/domain, said second pattern includes no skipped pulses and wherein if said first clock signal/domain has a lower rate than said second signal/domain, said first pattern includes no skipped pulses.

23. A system comprising:

a first device in a first clock domain having a first clock signal;

a second device in a second clock domain having a second clock signal, wherein said second clock signal has a higher clock rate than said first clock signal;

a plurality of storage locations coupled to said first device and said second device; and a skip pattern generator coupled said second device, wherein said skip pattern generator is configured to generate a pattern of valid pulses and skipped pulses of said second clock signal;

wherein in a first mode, said first device is configured to store each of a plurality of data values in said storage locations on a corresponding pulse of said first clock signal said second device is configured to retrieve each of said plurality of data values from said storage locations on a corresponding valid pulse of said second clock signal, and to inhibit retrieval of said plurality of data values from said storage locations on skipped pulses of said second clock signal; and wherein in a second mode, said second device is configured to store each of said plurality of data values in said storage locations on a corresponding valid pulse of said second clock signal said first device is configured to retrieve each of said plurality of data values from said storage locations on a corresponding pulse of said first clock signal.

* * * * *